(12) United States Patent
Liu (10) Patent No.: US 10,134,277 B2
(45) Date of Patent: Nov. 20, 2018

(54) METHOD AND SYSTEM FOR PROVIDING TRAFFIC INFORMATION (71) Applicant: TENCENT TECHNOLOGY (SHENZHEN) COMPANY LIMITED, Shenzhen (CN)

(72) Inventor: Chunying Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 138 days.

(21) Appl. No.: 14/639,936

(22) Filed: Mar. 5, 2015

(65) Prior Publication Data

US 2015/0179068 A1 Jun. 25, 2015

Related U.S. Application Data

(63) Continuation of application No. PCT/CN2013/081192, filed on Aug. 9, 2013.

(30) Foreign Application Priority Data

Sep. 13, 2012 (CN) .......................... 2012 1 0337690

(51) Int. Cl.
*G08G 1/0967* (2006.01)
*G08G 1/0968* (2006.01)
(Continued)

(52) U.S. Cl.
CPC ........ *G08G 1/0967* (2013.01); *G01C 21/3492* (2013.01); *G01C 21/3647* (2013.01);
(Continued)

(58) Field of Classification Search
CPC ....... G08G 1/096716; G08G 1/096775; G08G 1/096783; G08G 1/09675; G08G 1/096758
(Continued)

(56) References Cited

U.S. PATENT DOCUMENTS 8,289,187 B1 * 10/2012 Kerr .................. G08G 1/09626
340/905
8,762,035 B2 * 6/2014 Levine ............... G01C 21/3492
701/117
(Continued)

FOREIGN PATENT DOCUMENTS

CN 101256081 A 9/2008
CN 101278325 A 10/2008
(Continued)

OTHER PUBLICATIONS

Office Action Issued in Chinese Patent Application No. 201210337690.0, dated May 27, 2016, 11 pages.
(Continued)

*Primary Examiner* — Hai Phan
*Assistant Examiner* — Anthony D Afrifa-Kyei
(74) *Attorney, Agent, or Firm* — Oblon, McClelland, Maier & Neustadt, L.L.P.

(57) ABSTRACT

A method for prompting traffic condition information, comprising: a server obtaining traffic condition information about a road network (101); a client determining a candidate driving route and sending to the server a traffic condition information request aiming at the candidate driving route, and the server receiving the traffic condition information request, extracting traffic condition information about the candidate driving route from the traffic condition information about the road network, and sending to the client the traffic condition information about the candidate driving route; alternatively, the server actively sending to the client the traffic condition information about the road network (102); and the client displaying the traffic condition information provided by the server (103). The method can prompt traffic condition information in time, thereby improving the reminding efficiency; it can also be applied in
(Continued)

various terminal devices, and can be used across platform terminals, thereby having a wide scope of application.

15 Claims, 3 Drawing Sheets

(51) Int. Cl.
  *G01C 21/34* (2006.01)
  *G01C 21/36* (2006.01)
  *G08G 1/01* (2006.01)
(52) U.S. Cl.
  CPC ..... *G01C 21/3676* (2013.01); *G01C 21/3682* (2013.01); *G08G 1/096716* (2013.01); *G08G 1/096741* (2013.01); *G08G 1/096775* (2013.01); *G08G 1/096816* (2013.01); *G08G 1/096827* (2013.01); *G08G 1/096838* (2013.01); *G08G 1/096866* (2013.01); *G08G 1/012* (2013.01); *G08G 1/0112* (2013.01); *G08G 1/0133* (2013.01); *G08G 1/0141* (2013.01)
(58) Field of Classification Search
  USPC .............. 340/905, 426.19; 701/468, 491
  See application file for complete search history.

(56) References Cited

U.S. PATENT DOCUMENTS

| | | | |
|---|---|---|---|
| 2005/0065711 | A1 | 3/2005 | Dahlgren et al. |
| 2005/0090974 | A1* | 4/2005 | Hirose ............... G01C 21/3691 701/532 |
| 2005/0093720 | A1* | 5/2005 | Yamane ............ G01C 21/3492 340/995.13 |
| 2005/0149253 | A1* | 7/2005 | Nambata ................ G01C 21/34 701/533 |
| 2007/0038362 | A1 | 2/2007 | Gueziec |
| 2010/0094531 | A1* | 4/2010 | MacLeod ........... G01C 21/3694 701/119 |
| 2012/0041669 | A1 | 2/2012 | Zaitsu et al. |
| 2012/0123667 | A1* | 5/2012 | Gueziec ............... G08G 1/0112 701/119 |

FOREIGN PATENT DOCUMENTS

| | | | | |
|---|---|---|---|---|
| CN | 101344991 | A | 1/2009 | |
| CN | 101345773 | A | 1/2009 | |
| CN | 101533561 | A | 9/2009 | |
| CN | 101769757 | A | 7/2010 | |
| CN | 101777253 | A | 7/2010 | |
| CN | 201540652 | U | 8/2010 | |
| CN | 102334148 | A | 1/2012 | |
| CN | 102445209 | A | 5/2012 | |
| EP | 2495703 | A1 | 9/2012 | |
| JP | 2002-287616 | | 10/2002 | |
| JP | 2003-214877 | | 7/2003 | |
| JP | 2004-213570 | | 7/2004 | |
| JP | 2005-115625 | A | 4/2005 | |
| JP | 2009-217826 | | 9/2009 | |
| JP | 2012-008047 | | 1/2012 | |
| JP | 2012-047523 | | 3/2012 | |
| KR | 101465493 | B1 * | 11/2014 | ............ G01C 21/34 |
| WO | WO 01/15113 | A1 | 3/2001 | |

OTHER PUBLICATIONS

Office Action Issued in Japanese Patent Application No. 2015-531436, dated Apr. 5, 2016, 14 pages.
Office Action Issued in Chinese Patent Application No. 2012103376900 dated Jan. 19, 2016, in 10 pages.
The 4th chapter System Design and Related Technologies.
Chapter II Decision Support-oriented Highway Traffic Information Service System Analysis and Framework Research.
International Preliminary Report and Written Opinion of the International Searching Authority for International Application No. PCT/CN2013/081192, dated Mar. 17, 2015, in 17 pages.
International Search Report for International Application No. PCT/CN2013/081192, dated Nov. 14, 2013.

* cited by examiner

METHOD AND SYSTEM FOR PROVIDING TRAFFIC INFORMATION

This application is a continuation of International Application No. PCT/CN2013/081192, filed on Aug. 9, 2013, which claims the benefit and priority of Chinese Patent Application No. 201210337690.0, entitled "method and system for providing traffic information" and filed on Sep. 13, 2012. The entire disclosures of each of the above applications are incorporated herein by reference.

TECHNICAL FIELD

The present disclosure relates to information processing technologies, and more particularly to a method and system for providing traffic information.

BACKGROUND

In an information age, various information devices have been developed. These information devices include fixed-line phones and mobile phones for voice transmission, servers and personal computers for sharing and processing information resources, various televisions for displaying video data, etc. These information devices are developed in some fields to meet actual requirements. With the merge of Consumer electronics, Computer and Communication (called 3C for short), people pay more attention to the comprehensive utilization of information devices in different fields, thereby providing better services for people by ways of conventional resource devices.

Intelligent traffic technology has been widely applied. By the intelligent traffic technology, traffic information may be collected, processed, released, exchanged, analyzed and utilized, thereby providing diverse services for traffic participants. An intelligent traffic system is a future evolution direction. In the intelligent traffic system, advanced information technology, data communication technology, electronic sensor technology, control technology and computer technology are merged and applied to an entire ground traffic management system, thereby establishing a real-time, accurate, efficient and synthesized traffic management system. The traffic management system can function comprehensively in a large range.

In a current intelligent traffic system, a Global Positioning System (GPS) terminal is usually configured. A driver may determine a route according to a current location and a destination location that are provided by the GPS terminal, and adjust the route according to actual driving conditions. However, the GPS terminal is unable to provide current traffic information such as ground vehicle traffic conditions and ground maintaining conditions. Further, the utilization of the GPS terminal may be influenced greatly by weather conditions, especially the rain and fog weather.

In addition, a driver may obtain traffic information through on-board broadcast when driving. The on-board broadcast depends on the broadcast of an announcer, and the playing place and playing time of the on-board broadcast may influence the route selection of the driver. Accordingly, the reminding efficiency of on-board broadcast for a user is low.

SUMMARY

An embodiment of the present disclosure provides a method for providing traffic information, by which the traffic information may be provided to a user in time, and thus reminding efficiency may be improved.

An embodiment of the present disclosure provides a system for providing traffic information, by which the traffic information may be provided to a user in time, and thus reminding efficiency may be improved.

The solution of the present disclosure is implemented as follows.

A method for providing traffic information includes:

obtaining, by a server, traffic information of a road network;

selecting, by a client device, a candidate route, and sending to the server a request for traffic information corresponding to the candidate route;

receiving, by the server, the request from the client device, obtaining the traffic information corresponding to the candidate route from the traffic information of the road network, and sending the traffic information corresponding to the candidate route to the client device; or initiatively sending, by the server, the traffic information of the road network to the client device; or initiatively sending, by the server, the traffic information corresponding to the candidate route to the client device after the client device selects the candidate route; and presenting, by the client device, the traffic information provided by the server.

A system for providing traffic information includes a server and a client device, the client device is configured to select a candidate route, send to the server a request for traffic information corresponding to the candidate route, receive and present the traffic information provided by the server; and the server is configured to obtain traffic information of a road network, receive the request from the client device, obtain the traffic information corresponding to the candidate route from the traffic information of the road network, and send the traffic information corresponding to the candidate route to the client device; or the server is configured to initiatively send the traffic information of the road network to the client device; or the server is configured to initiatively send the traffic information corresponding to the candidate route to the client device after the client device selects the candidate route.

In the solution provided by the embodiments of the present disclosure, the server may initiatively send the traffic information to the client device, or send the traffic information to the client device based on the request of the client device. Accordingly, the traffic information such as ground vehicle traffic conditions and ground maintaining conditions can be provided to a user in time, and thus the reminding efficiency can be improved.

In addition, the solution provided by the embodiments of the present disclosure may be applied to various terminal devices, and may also be applied across multiple platforms and across multiple terminal devices. Accordingly, the solution of the present disclosure may be applied widely.

DETAILED DESCRIPTION

In order to make the object, technical solution and merits of the present disclosure clearer, the present disclosure will be illustrated hereinafter with reference to the accompanying drawings and embodiments.

In an embodiment of the present disclosure, a solution is provided to solve problems of conventional technology. In the solution, traffic information such as ground vehicle traffic conditions and ground maintaining conditions in a road network of each city may be stored in a server, and the server initiatively sends the traffic information to a client device, or the client device initiatively requests for the traffic information.

Figure 1:
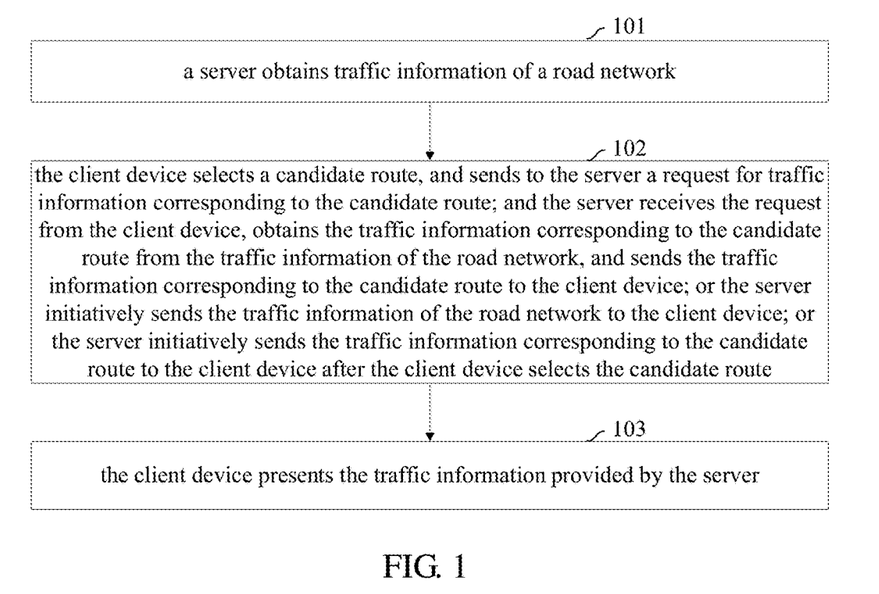
FIG. 1 is a flowchart illustrating a method for providing traffic information according to an embodiment of the present disclosure.

FIG. 1 is a flowchart illustrating a method for providing traffic information according to an embodiment of the present disclosure.

As shown in FIG. 1, the method includes following blocks.

At block 101, a server obtains traffic information of a road network.

The server may obtain the traffic information of the road network through multiple modes. In an implementation, the server may obtain the traffic information of the road network from a satellite through a GPS. In another implementation, the server may also obtain the traffic information of the road network from a third party terminal device or a website. For example, the third party terminal device may be a camera distributed in the road network, and the website may be an information release website of a traffic management department.

In an implementation, each client device distributed in the road network may initiatively send to the server traffic information around the geographical location of the client device, and then the server collects the traffic information around each geographical location to obtain the traffic information of the road network.

After obtaining the traffic information of the road network, the server stores the traffic information of the road network into a database.

At block 102, the client device selects a candidate route, and sends to the server a request for traffic information corresponding to the candidate route; and the server receives the request from the client device, obtains the traffic information corresponding to the candidate route from the traffic information of the road network, and sends the traffic information corresponding to the candidate route to the client device; or the server initiatively sends the traffic information of the road network to the client device; or the server initiatively sends the traffic information corresponding to the candidate route to the client device after the client device selects the candidate route.

In an implementation, the client device may determine a driving start point, a driving dwell point and a driving end point, and send the driving start point, the driving dwell point and the driving end point to the server. The server calculates a set of candidate routes according to the driving start point, the driving dwell point and the driving end point, and sends the set of candidate routes to the client device.

The client device selects the candidate route from the set of candidate routes, and sends to the server the request for the traffic information corresponding to the candidate route. The server receives the request from the client device, obtains the traffic information corresponding to the candidate route from the traffic information of the road network, and sends the traffic information corresponding to the candidate route to the client device.

For example, the driving start point determined by the client device is Beijing, the driving dwell point is Wuhan, and the driving end point is Shanghai. The client device sends the driving start point (Beijing), the driving dwell point (Wuhan) and the driving end point (Shanghai) to the server. The server calculates a set of candidate routes from Beijing to Wuhan and further to Shanghai based on the driving start point, the driving dwell point and the driving end point. Suppose the set of candidate routes includes a route A, a route B and a route C, and the server sends the route A, the route B and the route C to the client device.

The client device selects the candidate route from the route A, the route B and the route C. Suppose the client device selects the route C. The client device sends to the server a request for traffic information corresponding to the route C. The server receives the request from the client device, obtains the traffic information corresponding to the route C from the traffic information of the road network, and sends the traffic information corresponding to the route C to the client device.

In another implementation, the client device determines a driving start point, a driving dwell point and a driving end point, and sends to the server the driving start point, the driving dwell point, the driving end point and a request for traffic information.

The server calculates a set of candidate routes according to the driving start point, the driving dwell point and the driving end point, and sends to the client device the set of candidate routes and traffic information corresponding to each candidate route in the set of candidate routes.

The client device selects the candidate route from the set of candidate routes according to the traffic information corresponding to each candidate route in the set of candidate routes.

For example, the driving start point determined by the client device is Beijing, the driving dwell point is Wuhan, and the driving end point is Shanghai. The client device sends to the server the driving start point (Beijing), the driving dwell point (Wuhan), the driving end point (Shanghai) and the request for traffic information. The server calculates a set of candidate routes from Beijing to Wuhan and further to Shanghai based on the driving start point, the driving dwell point and the driving end point. Suppose the set of candidate routes includes the route A, the route B and the route C. The server sends to the client device the route A, the route B, the route C, the traffic information corresponding to the route A, the traffic information corresponding to the route B and the traffic information corresponding to the route C.

The client device selects the candidate route from the route A, the route B and the route C according to the traffic information corresponding to the route A, the traffic information corresponding to the route B and the traffic information corresponding to the route C. Suppose the client device selects the route C, and the route C is used as an ultimately determined route.

In an implementation, the server may initiatively send the traffic information of the road network to the client device.

In another implementation, after the client device selects the candidate route, the client device sends the candidate route to the server, and the server initiatively sends the traffic information corresponding to the candidate route to the client device.

The client device includes, but is not limited to, a feature phone, a smart phone, a palm computer, a Personal Computer (PC), a tablet computer and a Personal Digital Assistant (PDA), an on-board computer, an on-board radio and so on.

The traffic information may include traffic jam information, ground maintaining information, ground whether information, ground traffic control information and so on.

The foregoing has described some examples of the traffic information and the client device, but those skilled in the art can understand that these examples are only used for description, but are not used to limit the protection scope of the present disclosure.

In an implementation, the solution provided by the embodiments of the present disclosure may be applied across channels and across platforms. The channels include data channels and radio channels.

The server may send the traffic information to the client device through a data message channel or a radio message channel. The data channel refers to a channel for transferring information through a General Packet Radio Service (GPRS) mode or a WiFi mode. For example, information of Wechat or voice is transferred through the data channel. The radio channel refers to a channel for transferring information through a radio message channel. For example, a Short Messaging Service (SMS) is transferred through the radio channel.

The client device may receive the traffic information from the server through multiple communication modes.

According to a relationship between the direction and the time of information transfer, the communication modes between the client device and the server include a simplex communication mode, a semi-duplex communication mode and a full-duplex communication mode.

In the simplex communication mode, a simplex communication channel is a unidirectional channel, and the identities of the client device and the server are fixed. The server is only able to send information, but is unable to receive information. The client device is only able to receive information, but is unable to send information. That is, data signals are only able to be sent from one end to the other end, and the transfer direction of information stream is unidirectional.

In the semi-duplex communication mode, bidirectional communication may be implemented. However, communication on two directions is unable to be performed at the same time, but is able to be performed alternately. That is, any one end of a communication channel may be used as a sending end, and may also be used as a receiving end. However, at the same time, information can only be sent along with one direction. For example, walkie-talkie communication adopts the semi-duplex communication mode.

In the full-duplex communication mode, bidirectional signal transmission on a channel may be performed at any time. In the full-duplex communication mode, data is able to be transmitted on two directions, and thus two communication parties are able to send and receive data at the same time. In the full-duplex communication mode, each end of a communication system is configured with a transmitter and a receiver, and thus data may be transmitted on two directions at the same time. In the full-duplex communication mode, it is not needed to perform a direction switching operation, and thus a time delay generated by the direction switching operation may be avoided.

In the embodiment, the client device and the server may appoint a communication protocol, and define the format of an information unit in the communication protocol. The information unit includes information, meanings of the information, a connection mode, and a time sequence of sending and receiving the information, thereby ensuring that the information is sent to a determined destination.

For example, the communication protocol used in the embodiments of the present disclosure may include, but is not limited to, Transmission Control Protocol/Internet Protocol (TCP/IP), Hypertext transfer protocol (HTTP), Simple Mail Transfer Protocol (SMTP), Post Office Protocol 3 (POPS) and so on.

In the embodiments of the present disclosure, the server may send the traffic information through multiple communication standards, for example, Global System for Mobile communication (GSM), Wideband Code Division Multiple Access (WCDMA), CDMA-2000, Time Division-Synchronous Code Division Multiple Access (TD-SCDMA).

The traffic information received by the client device may have multiple encapsulation formats. For example, the traffic information may be encapsulated into, but is not limited to, a SMS, an electronic mail, Instant Messaging (IM) information, a Multimedia Messaging Service (MMS) or voice information.

The foregoing has described the format of the traffic information, but those skilled in the art can understand that these formats are examples, and are not used to limit the protection scope of the present disclosure.

In order to ensure the security of the traffic information, multiple protection modes for the traffic information may be performed on the client device, for example, screen saver settings, fingerprint association and the information association such as International Mobile Equipment Identity (IMEI) of mobile phone, thereby protecting the privacy security of the client device.

In an embodiment, the process of sending the traffic information to the client device by the server includes that, the server queries the information processing capability of the client device, automatically selects an information channel according to the information processing capability of the client device, and sends the traffic information to the client device through the selected information channel.

As can be seen, the server may determine the information processing capability of the client device, and automatically select the information channel according to the state of the information processing capability of the client device. For example, the state of the information processing capability of the client device may include an online state of the client device, a network state of the client device, and a state of the client device that is determined according to the resource processing capability of the client device.

In an implementation, the client device may prompt a user to select the information channel, or select the information channel according to the predefined configuration of the server. The predefined configuration of the server may have a higher priority.

At block 103, the client device presents the traffic information provided by the server.

The client device may present the traffic information provided by the server through multiple modes. For example, the client device may present the traffic information through a three-dimensional image, present the traffic information through animation stored by the client device, or present the traffic information through predefined colors or icons.

The ground traffic conditions and the ground maintaining conditions of each route may be represented with different colors and icons (including dots). When a user clicks a center region of ground, actual ground conditions may be presented. Accordingly, the user may objectively select a route. In the actual ground conditions, vehicle may be true vehicle, or may be represented with an icon.

In an implementation, the ground traffic conditions and the ground maintaining conditions of each route may be uploaded to the server. The server updates the obtained information to each client device in time. In another implementation, each client device may initiatively obtain the information from the server in time. The user may view the ground traffic conditions and the ground maintaining conditions through the client device, thereby selecting a proper route in time. In an implementation, one or more of a map, the ground traffic conditions, the ground maintaining conditions and ground parking conditions are used as the traffic information, so that a driver may select a more proper route (driving-route selection-parking-transaction entries).

In an implementation, if there is an unexpected condition in the route during a driving process, the driver is prompted according to the location of vehicle on the route, or the driver is prompted to drive according to a new speed-through route, and is prompted to select a new route.

An alarm condition of the traffic information may be preset.

The server determines whether the traffic information corresponding to the current route meets the alarm condition of the traffic information. If the traffic information corresponding to the current route meets the alarm condition of the traffic information, the server alarms the client device, calculates a standby route according to the driving start point, the driving dwell point and the driving end point provided by the client device, and sends the standby route to the client device.

Suppose the alarm condition of the traffic information is preset as rain and snow weather. When the server determines that the current weather on the current route (or a forecasted weather in the near future) is rain and snow weather, the server alarms the client device (for example, triggers a voice alarm or a letter alarm), calculates a standby route according to the driving start point, the driving dwell point and the driving end point provided by the client device, and sends the standby route to the client device.

Figure 2:
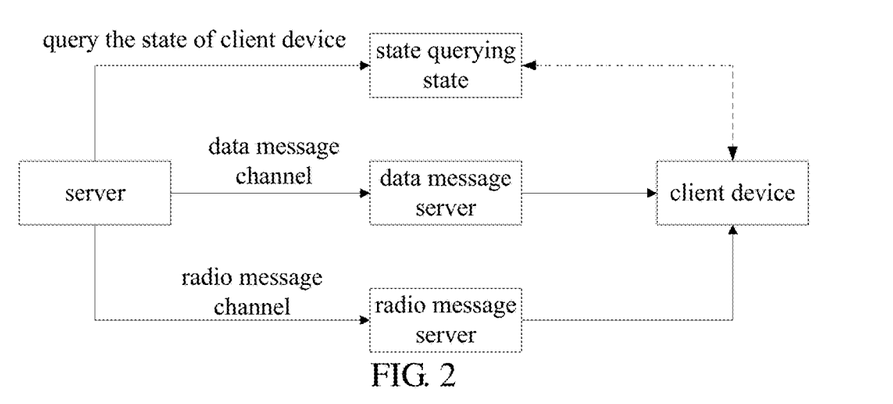
FIG. 2 is a diagram illustrating a process of querying the state of a client device according to an embodiment of the present disclosure.

FIG. 2 is a diagram illustrating a process of querying the state of a client device according to an embodiment of the present disclosure.

As shown in FIG. 2, the server may obtain the online state of the client device through a state querying server, and select an information channel according to the online state of the client device. When the client device is offline, the server sends the traffic information through a radio message channel. When the client device is online, the server sends the traffic information through a data message channel.

Figure 3:
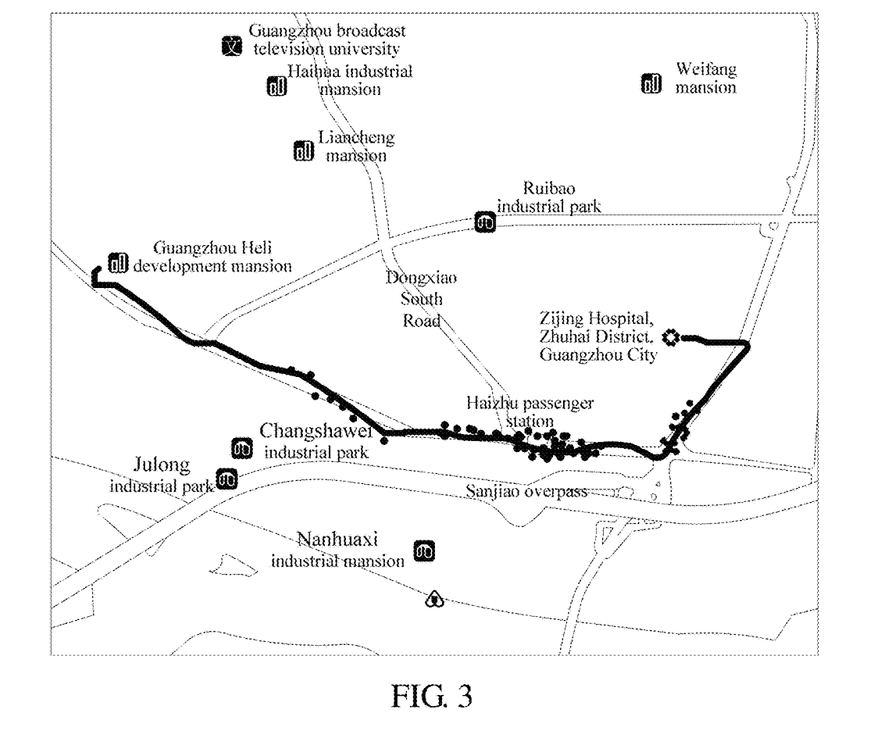
FIG. 3 is a diagram illustrating the display of traffic information according to an embodiment of the present disclosure.
Figure 4:
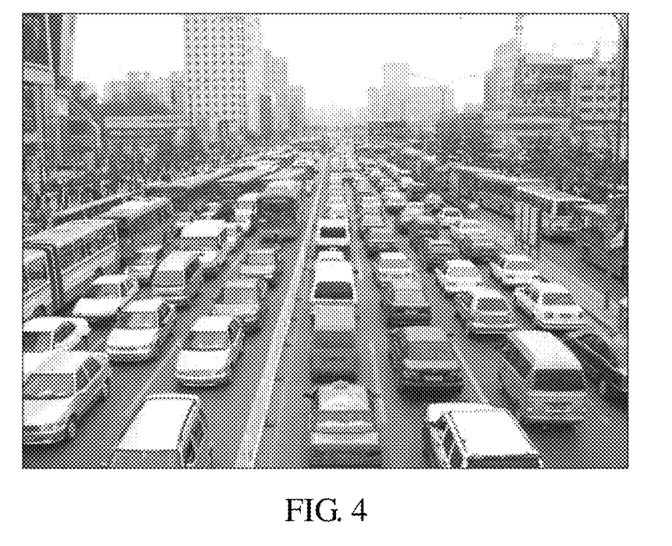
FIG. 4 is a diagram illustrating the display of traffic information according to another embodiment of the present disclosure.

FIG. 3 is a diagram illustrating the display of traffic information according to an embodiment of the present disclosure. FIG. 4 is a diagram illustrating the display of traffic information according to another embodiment of the present disclosure.

As shown in FIG. 3, a road jam degree may be represented through marking a map with dots. The more the dots on the map are, the higher the road jam degree is. For example, in FIG. 3, the number of dots around Haizhu passenger station is the largest, which represents that the road jam degree of routes around Haizhu passenger station is the highest. As shown in FIG. 4, the traffic information of a road may be represented with a true video image of the road.

Based on the above description, an embodiment of the present disclosure also provides a system for providing traffic information.

Figure 5:
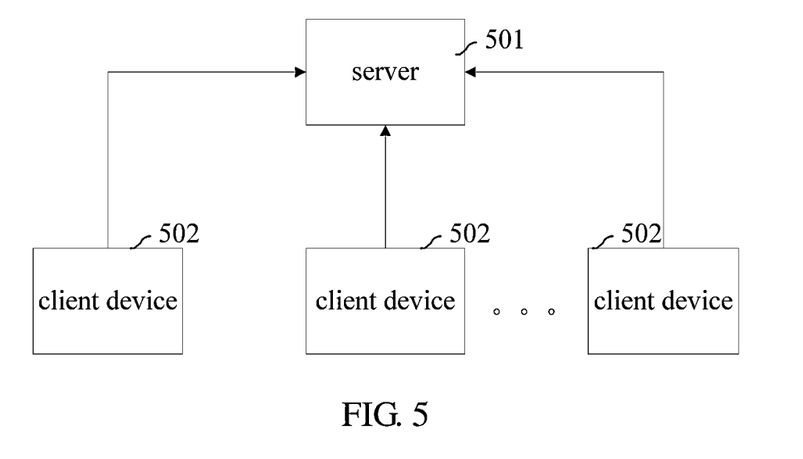
FIG. 5 is a diagram illustrating a system for providing traffic information according to an embodiment of the present disclosure.

FIG. 5 is a diagram illustrating a system for providing traffic information according to an embodiment of the present disclosure.

As shown in FIG. 5, the system includes a server 501 and a client device 502. There may be multiple client devices 502.

The client device 502 may select a candidate route, send to the server 501 a request for traffic information corresponding to the candidate route, receive and present the traffic information provided by the server 501.

In an implementation, the server 501 may obtain traffic information of a road network, receive the request from the client device 502, obtain the traffic information corresponding to the candidate route from the traffic information of the road network, and provide the traffic information corresponding to the candidate route to the client device 502. In another implementation, the server 501 may initiatively send the traffic information of the road network to the client device 502. In another implementation, the server 501 may initiatively send the traffic information corresponding to the candidate route to the client device 502 after the client device 502 selects the candidate route.

In an implementation, the server 501 may obtain the traffic information of the road network through a GPS.

In another implementation, the server 501 may also obtain the traffic information of the road network from a third party terminal device or a website.

In another implementation, the server 501 may receive traffic information provided by each client device 502 distributed in the road network.

In an implementation, the client device 502 may determine a driving start point, a driving dwell point and a driving end point, and send the driving start point, the driving dwell point and the driving end point to the server 501. The client device 502 may further receive a set of candidate routes from the server 501, select the candidate route from the set of candidate routes, and send to the server 501 a request for the traffic information corresponding to the candidate route.

The server 501 may calculate the set of candidate routes according to the driving start point, the driving dwell point and the driving end point provided by the client device 502, and send the set of candidate routes to the client device 502. The server 501 may further receive the request from the client device 502, obtain the traffic information corresponding to the candidate route from the traffic information of the road network, and send the traffic information corresponding to the candidate route to the client device 502.

For example, the driving start point determined by the client device is Beijing, the driving dwell point is Wuhan, and the driving end point is Shanghai. The client device sends the driving start point (Beijing), the driving dwell point (Wuhan) and the driving end point (Shanghai) to the server. The server calculates a set of candidate routes from Beijing to Wuhan and further to Shanghai based on the driving start point, the driving dwell point and the driving end point. Suppose the set of candidate routes includes a route A, a route B and a route C, and the server sends the route A, the route B and the route C to the client device.

The client device selects the candidate route from the route A, the route B and the route C. Suppose the client device selects the route C. The client device sends to the server a request for traffic information corresponding to the route C. The server receives the request from the client device, obtains the traffic information corresponding to the route C from the traffic information of the road network, and sends the traffic information corresponding to the route C to the client device.

In another embodiment, the client device 502 may determine a driving start point, a driving dwell point and a driving end point, and send the driving start point, the driving dwell point, the driving end point and a request for traffic information to the server 501. The client device 502 may further receive a set of candidate routes and traffic information corresponding to each candidate route in the set of candidate routes from the server 501, and select the candidate route from the set of candidate routes according to the traffic information corresponding to each candidate route in the set of candidate routes.

The server 501 may receive the driving start point, the driving dwell point, the driving end point and the request from the client device 502, calculate the set of candidate routes according to the driving start point, the driving dwell point and the driving end point, and send the set of candidate routes and the traffic information corresponding to each candidate route in the set of candidate routes to the client device 502.

For example, the driving start point determined by the client device is Beijing, the driving dwell point is Wuhan, and the driving end point is Shanghai. The client device sends to the server the driving start point (Beijing), the driving dwell point (Wuhan), the driving end point (Shanghai) and the request for traffic information. The server calculates a set of candidate routes from Beijing to Wuhan and further to Shanghai based on the driving start point, the driving dwell point and the driving end point. Suppose the set of candidate routes includes the route A, the route B and the route C. The server sends to the client device the route A, the route B, the route C, the traffic information corresponding to the route A, the traffic information corresponding to the route B and the traffic information corresponding to the route C.

The client device selects the candidate route from the route A, the route B and the route C according to the traffic information corresponding to the route A, the traffic information corresponding to the route B and the traffic information corresponding to the route C. Suppose the client device selects the route C, and the route C is used as an ultimately determined route.

The client device 501 includes, but is not limited to, a feature phone, a smart phone, a palm computer, a PC, a tablet computer and a PDA, an on-board computer, an on-board radio and so on.

The traffic information may include traffic jam information, ground maintaining information, ground whether information, ground traffic control information and so on.

The foregoing has described some examples of the traffic information and the client device, but those skilled in the art can understand that these examples are only used for description, but are not used to limit the protection scope of the present disclosure.

The server 501 may send the traffic information to the client device 502 through a data message channel or a radio message channel.

The server 501 may query the information processing capability of the client device 502, automatically select an information channel according to the information processing capability of the client device 502, and send the traffic information to the client device 502 according to the selected information channel.

In an implementation, the solution provided by the embodiments of the present disclosure may be applied across channels and across platforms. The channels include data channels and radio channels.

The server may send the traffic information to the client device through a data message channel or a radio message channel. The data channel refers to a channel for transferring information through a General Packet Radio Service (GPRS) mode or a WiFi mode. For example, information of Wechat or voice is transferred through the data channel. The radio channel refers to a channel for transferring information through a radio message channel. For example, a Short Messaging Service (SMS) is transferred through the radio channel.

The client device may receive the traffic information from the server through multiple communication modes.

According to a relationship between the direction and the time of information transfer, the communication modes between the client device and the server include a simplex communication mode, a semi-duplex communication mode and a full-duplex communication mode.

In the simplex communication mode, a simplex communication channel is a unidirectional channel, and the identities of the client device and the server are fixed. The server is only able to send information, but is unable to receive information. The client device is only able to receive information, but is unable to send information. That is, data signals are only able to be sent from one end to the other end, and the transfer direction of information stream is unidirectional.

In the semi-duplex communication mode, bidirectional communication may be implemented. However, communication on two directions is unable to be performed at the same time, but is able to be performed alternately. That is, any one end of a communication channel may be used as a sending end, and may also be used as a receiving end. However, at the same time, information can only be sent along with one direction. For example, walkie-talkie communication adopts the semi-duplex communication mode.

In the full-duplex communication mode, bidirectional signal transmission on a channel may be performed at any time. In the full-duplex communication mode, data is able to be transmitted on two directions, and thus two communication parties are able to send and receive data at the same time. In the full-duplex communication mode, each end of a communication system is configured with a transmitter and a receiver, and thus data may be transmitted on two directions at the same time. In the full-duplex communication mode, it is not needed to perform a direction switching operation, and thus a time delay generated by the direction switching operation may be avoided.

In the embodiment, the client device and the server may appoint a communication protocol, and define the format of an information unit in the communication protocol. The information unit includes information, meanings of the information, a connection mode, and a time sequence of sending and receiving the information, thereby ensuring that the information is sent to a determined destination.

For example, the communication protocol used in the embodiments of the present disclosure may include, but is not limited to, TCP/IP, HTTP, SMTP, POP5 and so on.

In the embodiments of the present disclosure, the server may send the traffic information through multiple communication standards, for example, GSM, WCDMA, CDMA-2000 and TD-SCDMA.

The traffic information received by the client device may have multiple encapsulation formats. For example, the traffic information may be encapsulated into, but is not limited to, a SMS, an electronic mail, Instant Messaging (IM) information, a Multimedia Messaging Service (MMS) or voice information.

The foregoing has described the format of the traffic information, but those skilled in the art can understand that these formats are examples, and are not used to limit the protection scope of the present disclosure.

In an implementation, the client device 502 may present the traffic information through a three-dimensional image, present the traffic information through animation stored by the client device 502, or present the traffic information through predefined colors or icons.

In an implementation, an alarm condition of the traffic state information may be preset by the server 501.

The server 501 may determine whether the traffic information corresponding to the current route meets the alarm condition of the traffic information. If the traffic information corresponding to the current route meets the alarm condition of the traffic information, the server 501 alarms the client device, calculates a standby route according to the driving start point, the driving dwell point and the driving end point provided by the client device 502, and sends the standby route to the client device 502.

The functions provided by the method shown in FIG. 1 and the system shown in FIG. 5 may be integrated into various hardware entities in a communication network. For example, the client device may be integrated into a feature phone, a smart phone, a palm computer, a PC, a tablet computer and a PDA or an on-board computer.

The method for providing traffic information may be implemented through multiple modes. In an implementation, the method for providing traffic information may be coded into a plug-in program according to an application interface. The plug-in program may be installed in a mobile phone or an on-board computer. In another implementation, the method for providing traffic information may be encapsulated into an application to be downloaded by a user. The method for providing traffic information may be coded into multiple plug-in programs, such as ocx, dll and cab. The method for providing traffic information may be implemented through a Flash plug-in, a RealPlayer plug-in, a Multimedia Messaging Service (MMS) plug-in, a Musical Instrument Digital Interface (MIDI) plug-in and an ActiveX plug-in.

The method for providing traffic information may be stored in various storage mediums in the form of instructions or instruction sets. The storage mediums include, but are not limited to, a floppy disk, a compact disc, a digital videodisc (DVD), a hard disk, a flash memory, a U disk, a Compact Flash (CF) card, a Secure Digital (SD) card, a MultiMedia Card (MMC), a SmartMedia (SM) card, a Memory Stick and an xD card.

The method for providing traffic information may be applied to Nand flash based storage mediums, for example, a U disk, a CF card, a SD card, a Secure Digital High-Capacity (SDHC) card, an MMC card, an SM card, a Memory Stick and an xD card.

In an embodiment of the present disclosure, the server may obtain the traffic information of the road network. The client device selects the candidate route, and sends to the server the request for the traffic information corresponding to the candidate route. The server receives the request from the client device, obtains the traffic information corresponding to the candidate route from the traffic information of the road network, and sends the traffic information corresponding to the candidate route to the client device. In another embodiment, the server initiatively sends the traffic information of the road network to the client device. In another embodiment, the server initiatively sends the traffic information corresponding to the candidate route to the client device after the client device selects the candidate route. The client device presents the traffic information provided by the server. As can be seen, in the embodiments of the present disclosure, the server may initiatively send the traffic information to the client device, or send the traffic information to the client device based on the request of the client device, thereby providing the traffic information including the ground traffic conditions and ground maintaining conditions in time and further improving the reminding efficiency.

In another embodiment, the traffic information may be played and forwarded, thereby improving the reminding efficiency. In addition, the solution provided by the embodiments of the present disclosure may be applied to various terminal devices, and may also be applied across platforms and across terminal devices. Accordingly, the solution may be applied widely.

The foregoing is only some embodiments of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for providing traffic information, comprising:
   obtaining, by a server, traffic information of a road network;
   selecting, by a client device, a candidate route from a set of candidate routes calculated by the server, and sending to the server a request for traffic information corresponding to the candidate route;
   receiving, by the server, the request from the client device, obtaining the traffic information corresponding to the candidate route from the traffic information of the road network, and sending the traffic information corresponding to the candidate route to the client device; or initiatively sending, by the server, the traffic information of the road network to the client device; or initiatively sending, by the server, the traffic information corresponding to the candidate route to the client device after the client device selects the candidate route; and
   presenting, by the client device, the traffic information provided by the server;
   wherein the selecting, by the client device, the candidate route, and sending to the server the request for the traffic information corresponding to the candidate route; receiving, by the server, the request from the client device, obtaining the traffic information corresponding to the candidate route from the traffic information of the road network, and sending the traffic information corresponding to the candidate route to the client device comprises:
   determining, by the client device, a driving start point, a driving dwell point and a driving end point, and sending the driving start point, the driving dwell point, the driving end point and a request for the traffic information to the server;

calculating, by the server, the set of candidate routes according to the driving start point, the driving dwell point and the driving end point, and sending the set of candidate routes and traffic information corresponding to each candidate route in the set of candidate routes to the client device; and selecting, by the client device, the candidate route from the set of candidate routes according to the traffic information corresponding to each candidate route in the set of candidate routes;

wherein the client device has at least two different states of operation, (i) online state and (ii) offline state, sending the traffic information corresponding to the candidate route to the client device comprises:

determining, by the server, a state of the client device as one of the online state and offline state;

selecting, by the server, an information channel automatically according to the determined state of the client device; and sending, by the server, the traffic information corresponding to the candidate route to the client device through the selected information channel.

2. The method of claim 1, wherein the obtaining, by the server, the traffic information of the road network comprises one of:

obtaining, by the server, the traffic information of the road network through a Global Positioning System (GPS);

obtaining, by the server, the traffic information of the road network from a third party terminal device or a website; and obtaining, by the server, the traffic information of the road network uploaded by a client device distributed in the road network.

3. The method of claim 1, wherein the traffic information comprises at least one piece of traffic jam information, ground maintaining information, ground weather information and ground traffic control information.

4. The method of claim 1, wherein the sending, by the server, the traffic information corresponding to the candidate route to the client device comprises:

sending, by the server, the traffic information corresponding to the candidate route to the client device through a data message channel or a radio message channel.

5. The method of claim 1, wherein the presenting, by the client device, the traffic information provided by the server comprises one of:

presenting, by the client device, the traffic information through a three-dimensional image;

presenting, by the client device, the traffic information through animation stored by the client device; and presenting, by the client device, the traffic information through predefined colors or icons.

6. A method for providing traffic information, comprising:

obtaining, by a server, traffic information of a road network;

selecting, by a client device, a candidate route from a set of candidate routes calculated by the server, and sending to the server a request for traffic information corresponding to the candidate route;

receiving, by the server, the request from the client device, obtaining the traffic information corresponding to the candidate route from the traffic information of the road network, and sending the traffic information corresponding to the candidate route to the client device; or initiatively sending, by the server, the traffic information of the road network to the client device; or initiatively sending, by the server, the traffic information corresponding to the candidate route to the client device after the client device selects the candidate route; and presenting, by the client device, the traffic information provided by the server;

wherein the method further comprises:

presetting an alarm condition of the traffic information; and determining, by the server, whether traffic information corresponding to a current route meets the alarm condition of the traffic information; when the traffic information corresponding to the current route meets the alarm condition of the traffic information, alarming the client device, calculating a standby route according to a driving start point, a driving dwell point, a driving end point provided by the client device, and sending the standby route to the client device;

wherein the client device has at least two different states of operation, (i) online state and (ii) offline state, sending the traffic information corresponding to the candidate route to the client device comprises:

determining, by the server, a state of the client device as one of the online state and offline state;

selecting, by the server, an information channel automatically according to the determined state of the client device; and sending, by the server, the traffic information corresponding to the candidate route to the client device through the selected information channel.

7. A system for providing traffic information, comprising a server and a client device;

the client device is configured to select a candidate route from a set of candidate routes calculated by the server, send to the server a request for traffic information corresponding to the candidate route, receive and present the traffic information provided by the server; and the server is configured to obtain traffic information of a road network, receive the request from the client device, obtain the traffic information corresponding to the candidate route from the traffic information of the road network, and send the traffic information corresponding to the candidate route to the client device; or the server is configured to initiatively send the traffic information of the road network to the client device; or the server is configured to initiatively send the traffic information corresponding to the candidate route to the client device after the client device selects the candidate route;

wherein the client device is configured to determine a driving start point, a driving dwell point and a driving end point, and send the driving start point, the driving dwell point, the driving end point and a request for the traffic information to the server; receive the set of candidate routes and traffic information corresponding to each candidate route in the set of candidate routes from the server, select the candidate route from the set of candidate routes according to the traffic information corresponding to each candidate route in the set of candidate route;

and wherein the server is configured to receive the driving start point, the driving dwell point and the driving end point from the client device, calculate the set of candidate routes according to the driving start point, the driving dwell point and the driving end point, and send the set of candidate routes and the traffic information corresponding to each candidate route in the set of candidate routes to the client device;

wherein the client device has at least two different states of operation, (i) online state and (ii) offline state, the server is further configured to:
determine a state of the client device as one of the online state and offline state,
select an information channel automatically according to the determined state of the client device, and
send the traffic information corresponding to the candidate route to the client device through the selected information channel.

8. The system of claim 7, wherein the server is configured to do one of following processes:
obtaining the traffic information of the road network through a Global Positioning System (GPS);
obtain the traffic information of the road network from a third party terminal device or a website; and
obtaining the traffic information of the road network uploaded by a client device distributed in the road network.

9. The system of claim 7, wherein the traffic information comprises at least one piece of traffic jam information, ground maintaining information, ground weather information and ground traffic control information.

10. The system of claim 7, wherein the server is configured to send the traffic information to the client device through a data message channel or a radio message channel.

11. The system of claim 7, wherein the client device is configured to do one of following processes:
presenting the traffic information through a three-dimensional image;
presenting the traffic information through animation stored by the client device; and
presenting the traffic information through predefined colors or icons.

12. The system of claim 7, wherein an alarm condition of the traffic information is preset; and
the server is configured to determine whether traffic information corresponding to a current route meets the alarm condition of the traffic information; when the traffic information corresponding to the current route meets the alarm condition of the traffic information, the server is configured to alarm the client device, calculate a standby route according to the driving start point, the driving dwell point and the driving end point provided by the client device, and send the standby route to the client device.

13. The method of claim 6, wherein the obtaining, by the server, the traffic information of the road network comprises one of:
obtaining, by the server, the traffic information of the road network through a Global Positioning System (GPS);
obtaining, by the server, the traffic information of the road network from a third party terminal device or a website; and
obtaining, by the server, the traffic information of the road network uploaded by a client device distributed in the road network.

14. The method of claim 6, wherein the selecting, by the client device, the candidate route, and sending to the server the request for the traffic information corresponding to the candidate route; receiving, by the server, the request from the client device, obtaining the traffic information corresponding to the candidate route from the traffic information of the road network, and sending the traffic information corresponding to the candidate route to the client device comprises:
determining, by the client device, the driving start point, the driving dwell point and the driving end point, and sending the driving start point, the driving dwell point and the driving end point to the server;
calculating, by the server, the set of candidate routes according to the riving start point, the driving dwell point and the driving end point, and sending the set of candidate routes to the client device;
selecting, by the client device, the candidate route from the set of candidate routes, and sending the request for the traffic information corresponding to the candidate route to the server; and
receiving, by the server, the request from the client device, obtaining the traffic information corresponding to the candidate route from the traffic information of the road network, and sending the traffic information corresponding to the candidate route to the client device.

15. The method of claim 6, wherein the presenting, by the client device, the traffic information provided by the server comprises one of:
presenting, by the client device, the traffic information through a three-dimensional image;
presenting, by the client device, the traffic information through animation stored by the client device; and
presenting, by the client device, the traffic information through predefined colors or icons.

* * * * *